US006698779B2

(12) United States Patent
Jeng (10) Patent No.: US 6,698,779 B2
(45) Date of Patent: Mar. 2, 2004

(54) KINETIC ENERGY GENERATING MECHANISM

(76) Inventor: Fu-shen Jeng, 5 Fl., No. 32, Sec. 1, Huanhe E. Rd., Yunghe City, Taipei Hsien (TW)

( * ) Notice: Subject to any disclaimer, the term of this patent is extended or adjusted under 35 U.S.C. 154(b) by 0 days.

(21) Appl. No.: 10/179,896

(22) Filed: Jun. 26, 2002

(65) Prior Publication Data

US 2004/0000442 A1 Jan. 1, 2004

(51) Int. Cl.$^7$ ................................................ B62M 1/00
(52) U.S. Cl. ...................... 280/210; 280/221; 280/252; 482/70
(58) Field of Search ................................ 280/210, 212, 280/214, 221, 252, 255; 482/52, 70

(56) References Cited

U.S. PATENT DOCUMENTS

| | | | | |
|---|---|---|---|---|
| 2,118,640 A | * | 5/1938 | Bergen | 280/221 |
| 2,449,266 A | * | 9/1948 | Woods | 280/251 |
| 4,124,222 A | * | 11/1978 | Moe et al. | 280/221 |
| 4,733,858 A | * | 3/1988 | Lan | 482/53 |
| 5,989,163 A | * | 11/1999 | Rodgers, Jr. | 482/70 |
| 6,173,981 B1 | * | 1/2001 | Coleman | 280/253 |
| 6,270,102 B1 | * | 8/2001 | Fan | 280/252 |
| 6,334,838 B1 | * | 1/2002 | Lee | 482/51 |
| 6,398,244 B1 | * | 6/2002 | Chueh | 280/221 |
| 6,402,173 B1 | * | 6/2002 | Chiu | 280/252 |
| 6,505,845 B1 | * | 1/2003 | Fong | 280/228 |
| 6,520,525 B1 | * | 2/2003 | Yoon | 280/278 |
| 6,572,128 B2 | * | 6/2003 | Graf | 280/221 |

* cited by examiner

Primary Examiner—Lesley D. Morris
Assistant Examiner—Tony Winner
(74) Attorney, Agent, or Firm—Bacon & Thomas, PLLC.

(57) ABSTRACT

A kinetic energy generating mechanism includes a driven mechanism having a transmission member wound around two driving members that are rotatably connected to two pivotal shafts fixedly connected to a vehicle at predetermined positions, a transmission mechanism having front and rear rotating shafts mounting on the vehicle, and two transmission members separately wound around two pairs of front and rear driving members that are engaged with two unidirectional-rotation control members provided on at least the rear rotating shaft, and two actuating mechanisms fixedly connected to the transmission members of the driven and the transmission mechanisms. By applying a rearward force to slide either of the two actuating mechanisms, two rear wheels of the vehicle connected to two ends of the rear rotating shaft could be rotated forward with largely reduced effort.

13 Claims, 8 Drawing Sheets

KINETIC ENERGY GENERATING MECHANISM

FIELD OF THE INVENTION

The present invention relates to a kinetic energy generating mechanism mounted on a vehicle and including two actuating mechanisms. The actuating mechanisms are connected to a transmission mechanism that includes front and rear rotating shafts mounted on the vehicle, and two transmission members separately wound around two pairs of front and rear driving members while the rear driving members are engaged with two unidirectional-rotation control means provided on at least the rear rotating shaft. By applying a rearward force to slide either of the two actuating mechanisms, two rear wheels of the vehicle connected to two ends of the rear rotating shaft could be rotated forward with largely reduced effort.

BACKGROUND OF THE INVENTION

Figure 1:
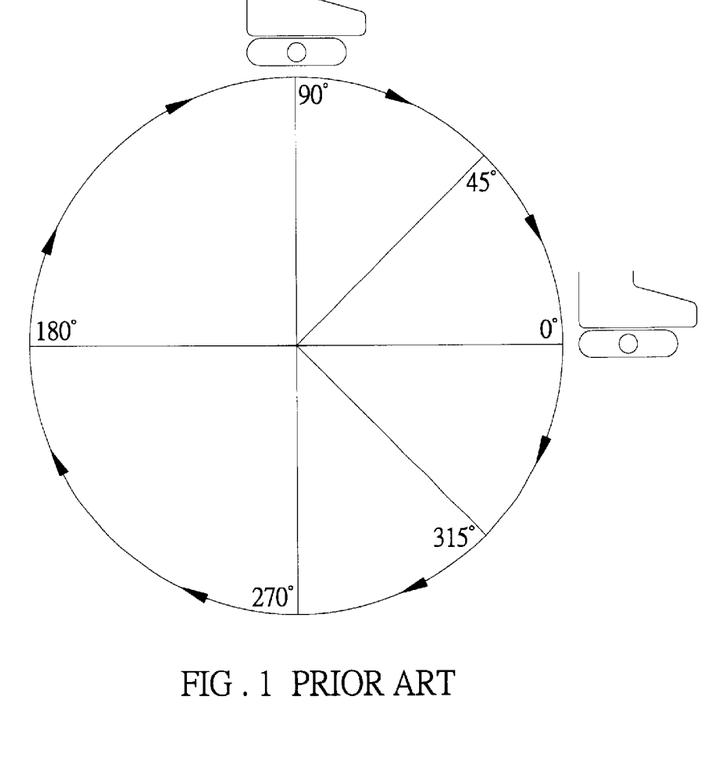
FIG. 1 shows the circular motion of a pedal of a conventional bicycle.
Figure 2:
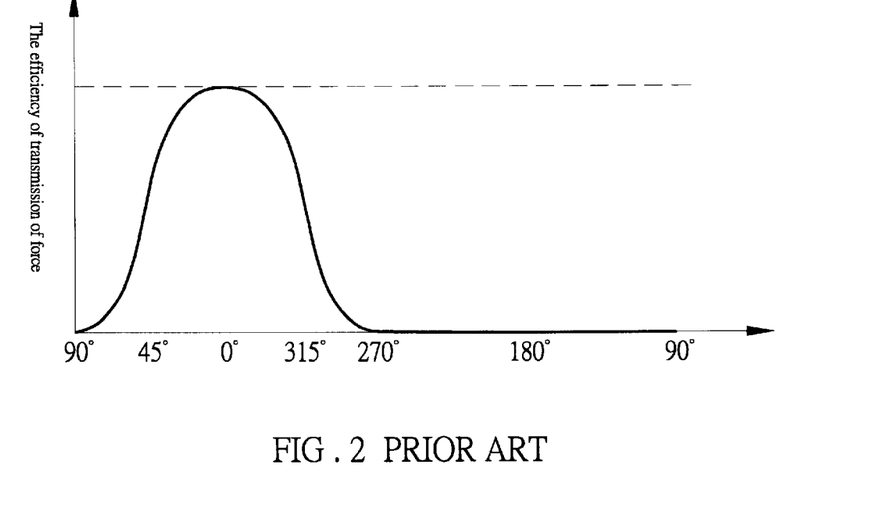
FIG. 2 is a curve showing the efficiency of transmission of force applied by a cyclist via pedals of the conventional bicycle.

A conventional bicycle of prior art normally found in the market is moved forward through circular motions of two pedals thereof actuated by a cyclist's two feet. That is, a force applied by the cyclist's two feet on the pedals is converted into a kinetic energy to move the bicycle forward. Basically, such conventional kinetic energy generating mechanism employed on the bicycle has three major drawbacks: (a) the force applied by the cyclist's two feet is transferred to the pedals and converted into kinetic energy to move the bicycle forward only when the pedals are located at positions between 90 degrees and 270 degrees in the circular motion, as shown in FIG. 1; (b) the pedals transfer the applied force in a high efficiency of transmission only when they are located at positions between 45 degrees and 315 degrees, as shown in FIG. 2; and (c) the cyclist usually sits on a saddle of the bicycle to rotate the pedals with two feet and can therefore apply only a rather small force on the pedals to drive the bicycle forward. Generally speaking, the force that can be applied by the two feet is only about a quarter of the cyclist's weight.

Figure 3:
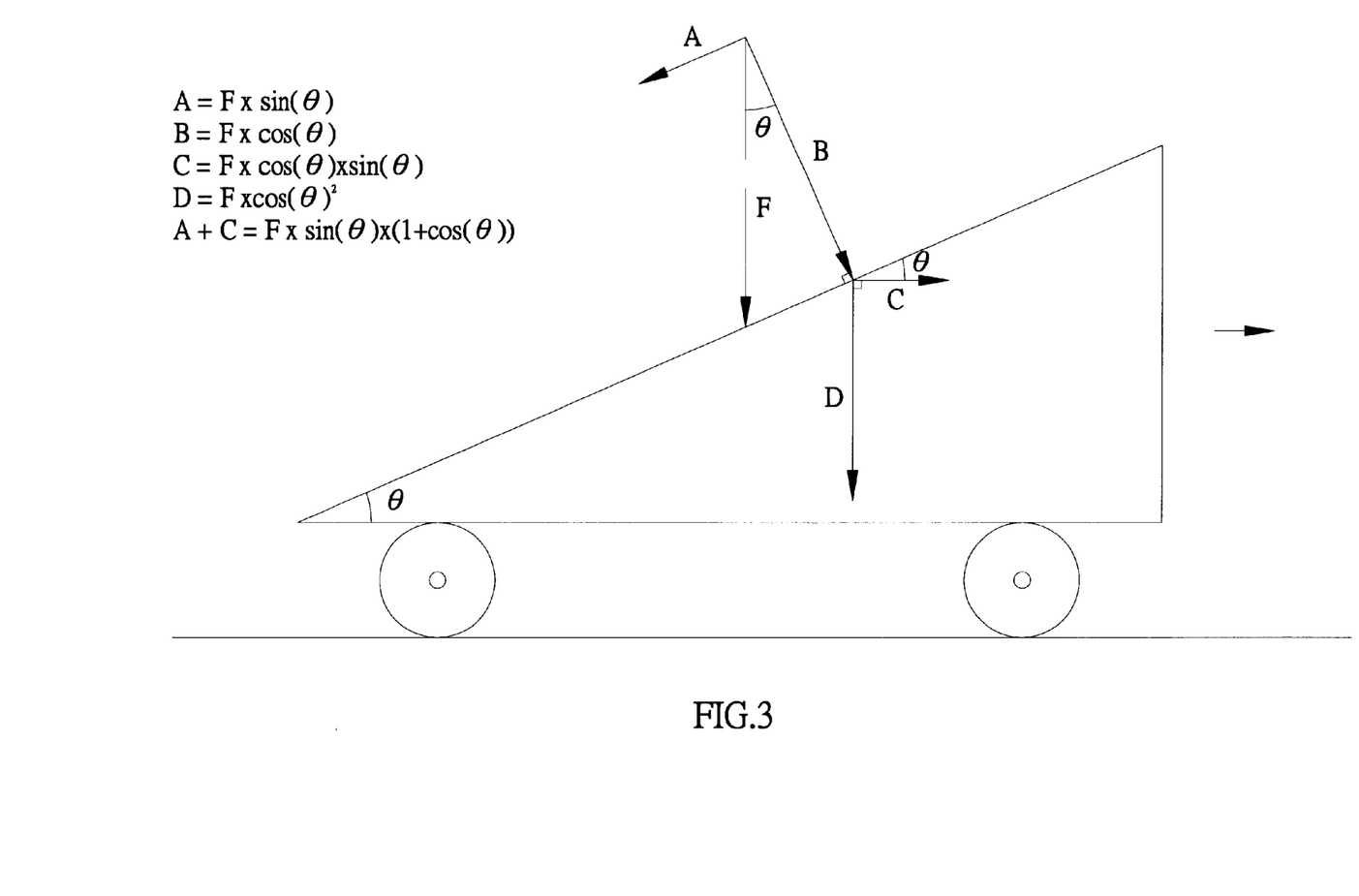
FIG. 3 analyzes the force applied by a user on the present invention.

The inventor has conducted research on the basic principle for moving a vehicle forward and found from the research results that when a vehicle is provided at a top with an inclined plane to contain an angle θ between the inclined plane and the ground surface, and wheels are mounted to a horizontal bottom of the vehicle, as shown in FIG. 3, a total force applied by a user walking or running on the inclined plane of the vehicle includes the user's weight and a kinetic force generated by the user through walking or running on the inclined plane. Given that the total applied force is F and according to the kinetics, F can be decomposed into two applied forces A and B. The applied force A has a magnitude of Fxsin(θ), and the applied force B has a magnitude of Fxcos(θ). The applied force A would cause the user to slip downward on the inclined plane on the vehicle. With a properly designed kinetic energy generating mechanism, the applied force A could be converted into a kinetic energy to move the vehicle forward. The applied force B is mainly applied on the vehicle and can be decomposed into two applied forces C and D. The applied force C has a magnitude of Fxcos(θ)xsin(θ), while the applied force D has a magnitude of Fxcos(θ)$^2$. The applied force C directly moves the vehicle forward, and the applied force D is absorbed by the ground via the wheels of the vehicle.

In conclusion, the vehicle is moved forward by a total kinetic energy from the applied forces A and C, that is, a force having a magnitude of Fx sin (θ)x(1+cos (θ)) When the angle θ is 30 degrees, the total kinetic energy moving the vehicle forward is about 0.9330xF, and when the angle θ is 45 degrees, the total kinetic energy moving the vehicle forward is about 1.2071xF. In other words, when a user of 60 kgs in weight walks or runs on the inclined plane having an inclination angle θ of 30 degrees, a force larger than 55.98 kgs would be applied on the vehicle to move the same forward; and when a user of 60 kgs in weight walks or runs on the inclined plane having an inclination angle θ of 45 degrees, a force larger than 72.426 kgs would be applied on the vehicle to move the same forward.

The above-mentioned applied force capable of gloving the vehicle forward is about four times as large as the applied force that could be applied by the cyclist on the pedals to move the bicycle forward. Moreover, unlike the kinetic energy generating mechanism for the conventional bicycle, that is, the two pedals, which is in a low-efficiency, attenuated, or idle state in almost three quarters of the action period thereof, the above-mentioned applied force for moving the vehicle forward can always be maintained at stable magnitude and transmission efficiency. In brief, it is found by the inventor a properly designed kinetic energy generating mechanism could generate kinetic energy for moving a vehicle forward about 16 times as large as that could be generated with the conventional bicycle.

Therefore, it would be desirable to develop a kinetic energy generating mechanism based on the above-described principle to generate relatively high kinetic energy to move a vehicle forward with reduced efforts made by a user.

SUMMARY OF THE INVENTION

A primary object of the present invention is to provide a kinetic energy generating mechanism that is mounted on a vehicle and uses force applied by a user to generate kinetic energy sufficient for moving the vehicle forward easily. Since all the force applied by the user is converted into the kinetic energy, the vehicle can be easily moved forward with reduced effort made by the user.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 4:
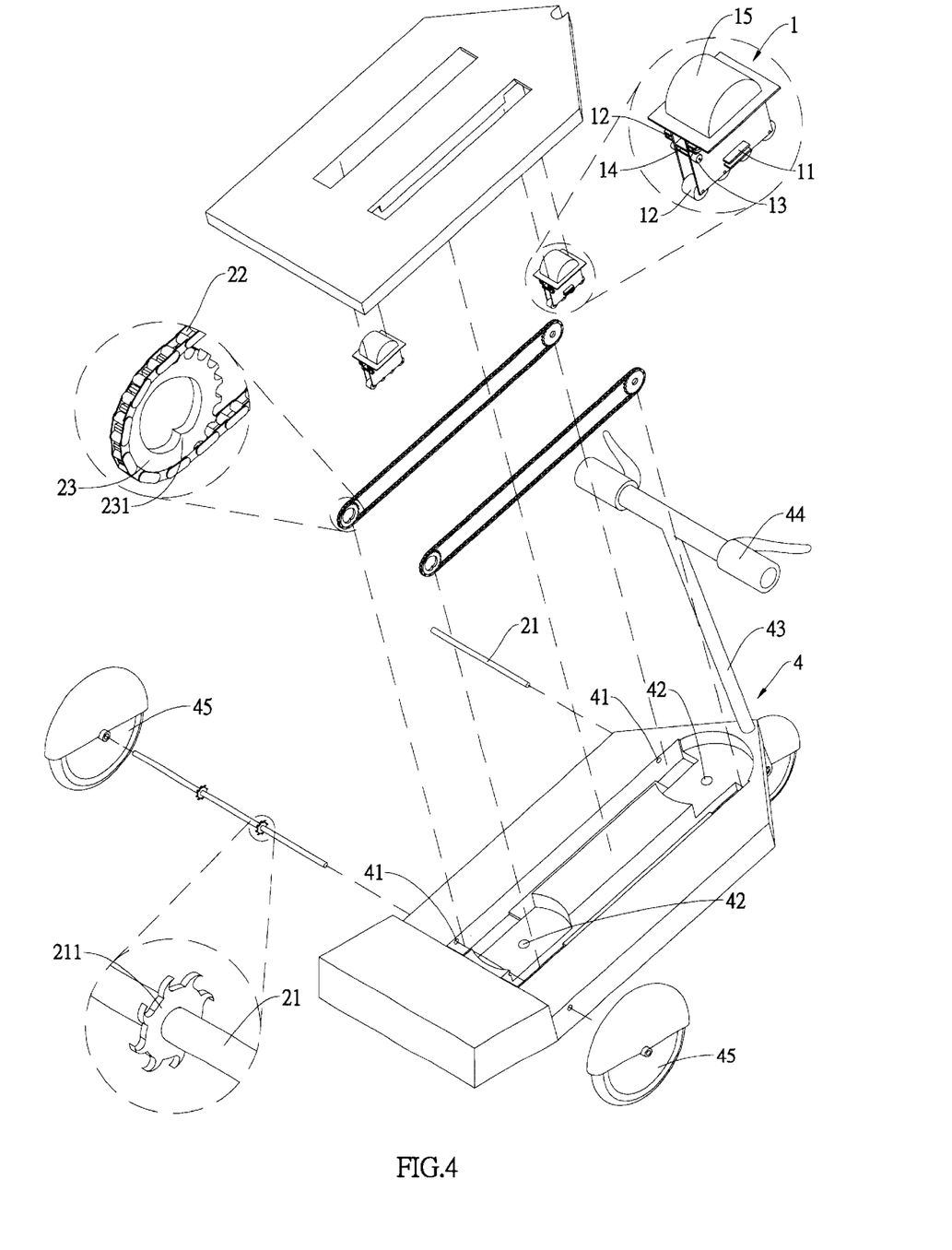
FIG. 4 is an exploded perspective view of the present invention.
Figure 5:
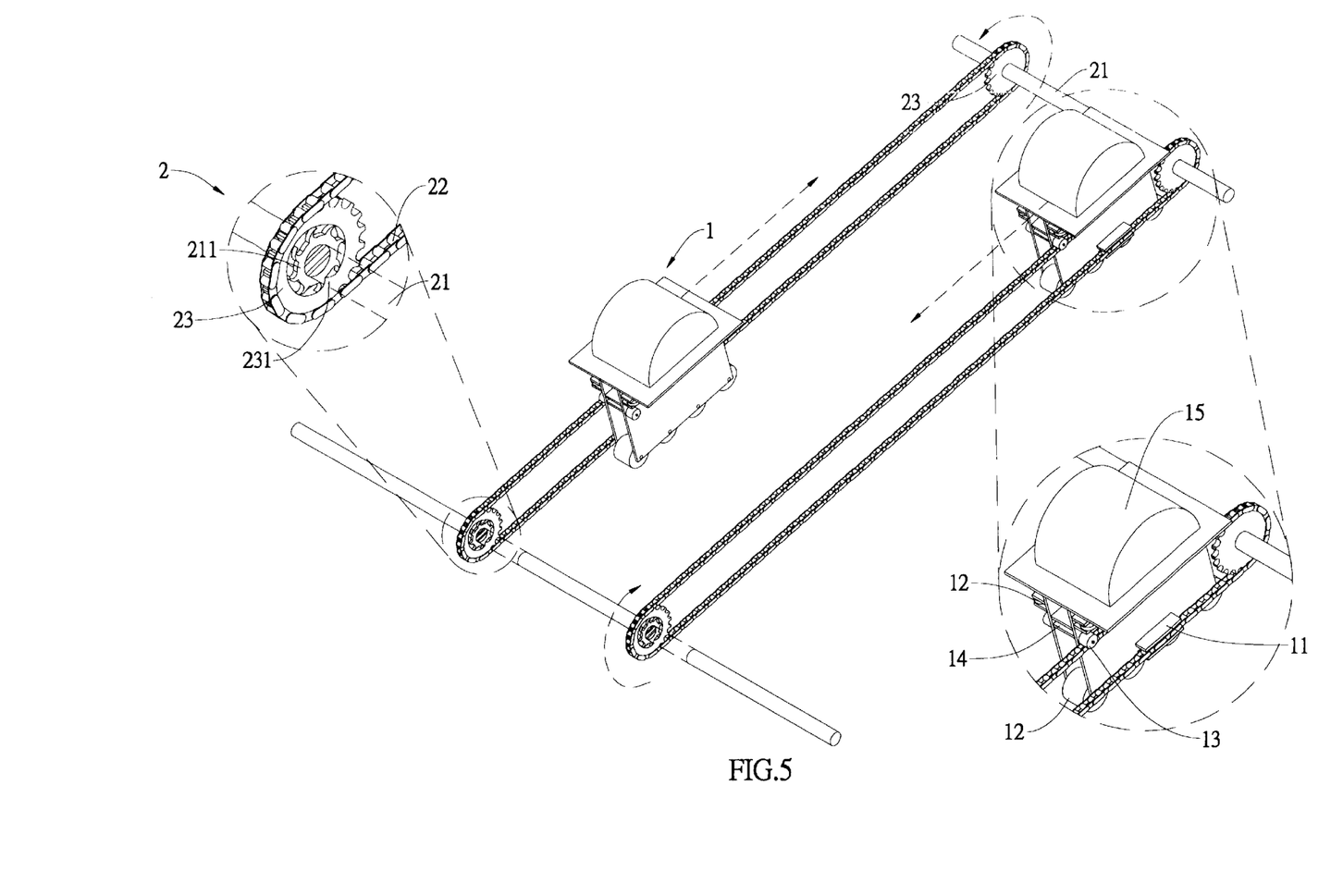
FIG. 5 is a perspective view showing the assembly of the actuating mechanism and the transmission mechanism of the present invention.

Please refer to FIG. 4 that is an exploded perspective view of a kinetic energy generating mechanism for mounting on a vehicle 4 according to the present invention. As shown, the kinetic energy generating mechanism mainly includes a pair of actuating mechanisms 1 and a transmission mechanism 2. The transmission mechanism 2 includes a front and a rear rotating shaft 21, a pair of transmission members 22, which is preferably a pair of chains, and two pairs of front and rear driving members 23, which are preferably two pairs of gears. Each rotating shaft 21 is rotatably connected at two ends to two shaft holes 41 provided on the vehicle 4 at predetermined positions for the driving members 23 to rotatably mount thereon. The two transmission members 22 are separately wound around the two pairs of driving members 23 to define two rotating paths. Please also refer to FIG. 5 that shows the manner of assembling the actuating mechanism 1 to the transmission mechanism 2. The actuating mechanism 1 is provided at an outer side with a locating means or device 11, to which the transmission member 22 is fixedly connected. At least the rear rotating shaft 21 is provided with two unidirectional-rotation control means or members 211, which are preferably two unidirectional gears, to engage with engaging means 231 provided on the two rear driving members 23 of the transmission mechanism 2. The actuating mechanism 1 includes a set of sliding means or members 12, which is preferably a set of rollers, for the actuating mechanism 1 to smoothly slide on the vehicle 4 along a predetermined path. The actuating mechanism 1 also includes a brake means or member 13, which is preferably a roller, for preventing the transmission member 22 of the transmission mechanism 2 passing therethrough from easily becoming loose and deformed during rotating.

At least the rear rotating shaft 21 of the transmission mechanism 2 is optionally provided at an outer end with a derailleur (not shown) to facilitate convenient self-adjustment of rotating speed of two rear wheels 45 of the vehicle 4, so that the vehicle 4 may be moved forward with even reduced efforts made by the user.

Figure 6:
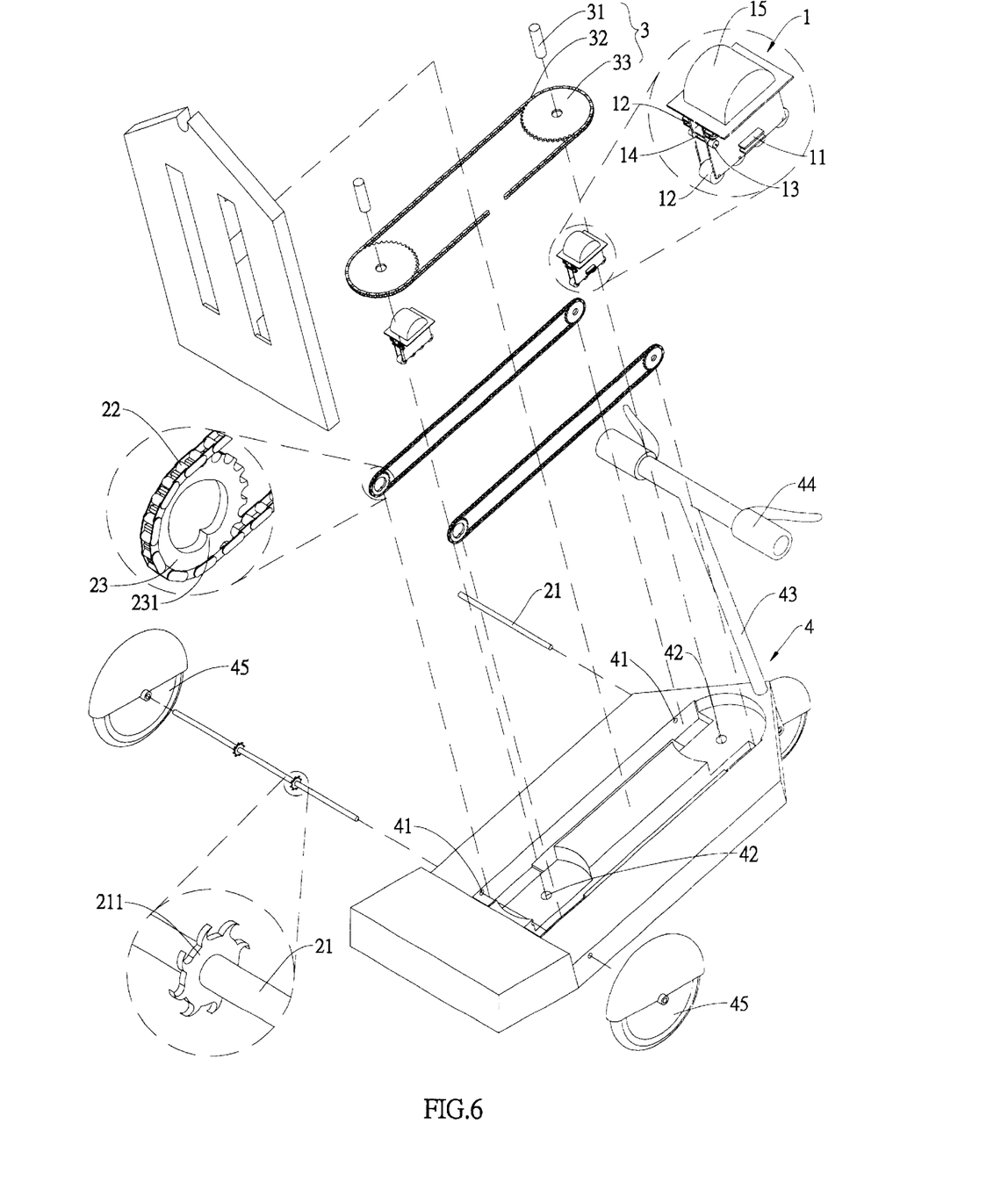
FIG. 6 is another exploded perspective view of the present invention, in which a driven mechanism is shown.

Please refer to FIG. 6 that is another exploded perspective view of the present invention, in which a driven mechanism 3 is included. The driven mechanism 3 mainly includes a front and a rear pivotal shaft 31, a transmission member 32, which is preferably a chain, and a front and a rear driving member 33, which are preferably two gears. The driving members 33 are separately rotatably mounted on the two pivotal shafts 31 that are fixedly received in two shaft holes 42 provided on the vehicle 4 at predetermined positions. The transmission member 32 is wound around the two driving members 33 to define two parallel paths. Each of the two actuating mechanisms 1 is provided at a predetermined position with a connecting means or member 14, and the transmission member 32 of the driven mechanism 3 is fixedly connected to the connecting means 14, as can be clearly seen in FIGS. 8 and 9, so that the two actuating mechanisms 1 are separately located at the two parallel paths defined by the transmission member 32.

Figure 7:
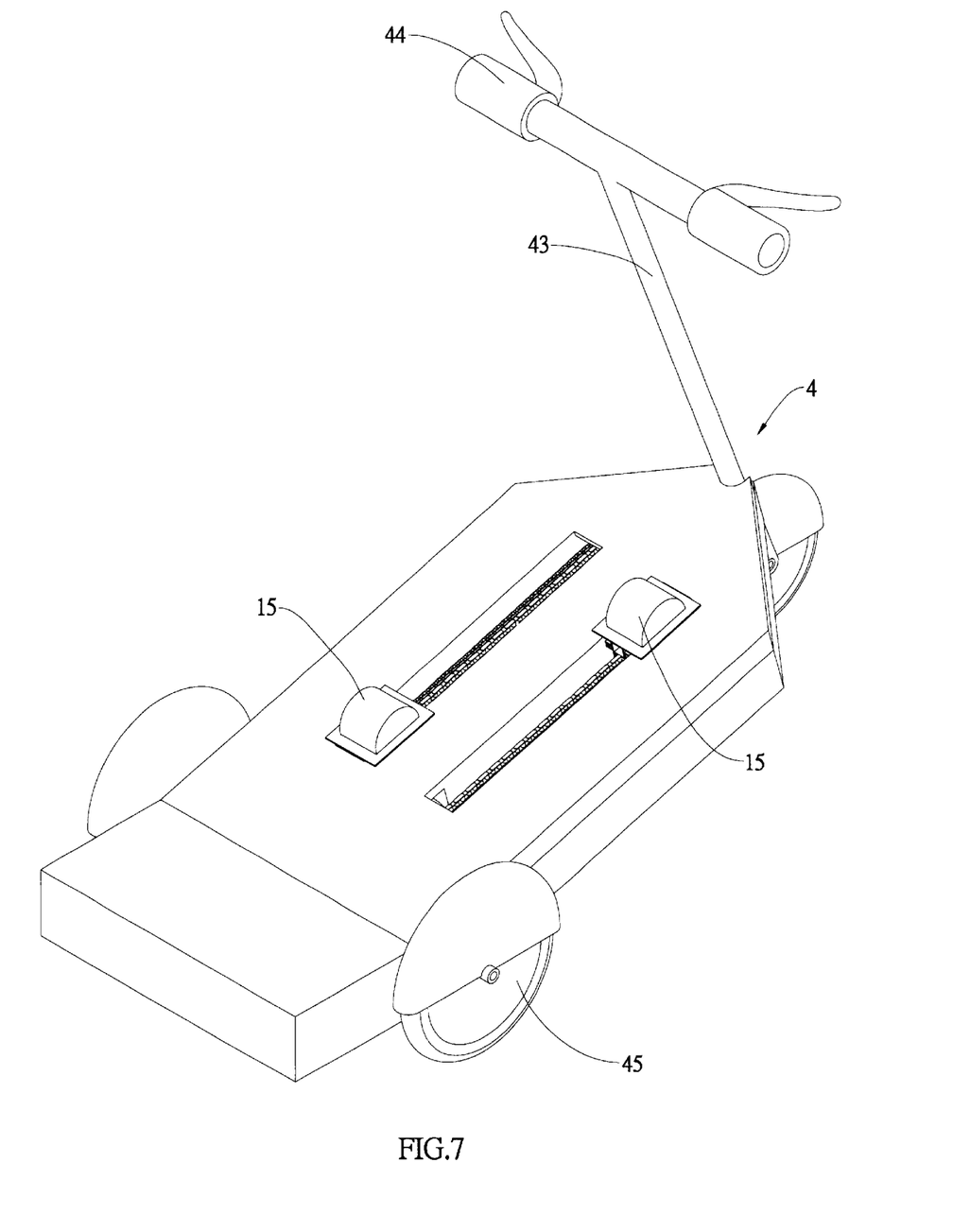
FIG. 7 is an assembled perspective view of a vehicle equipped with the present invention.
Figure 8:
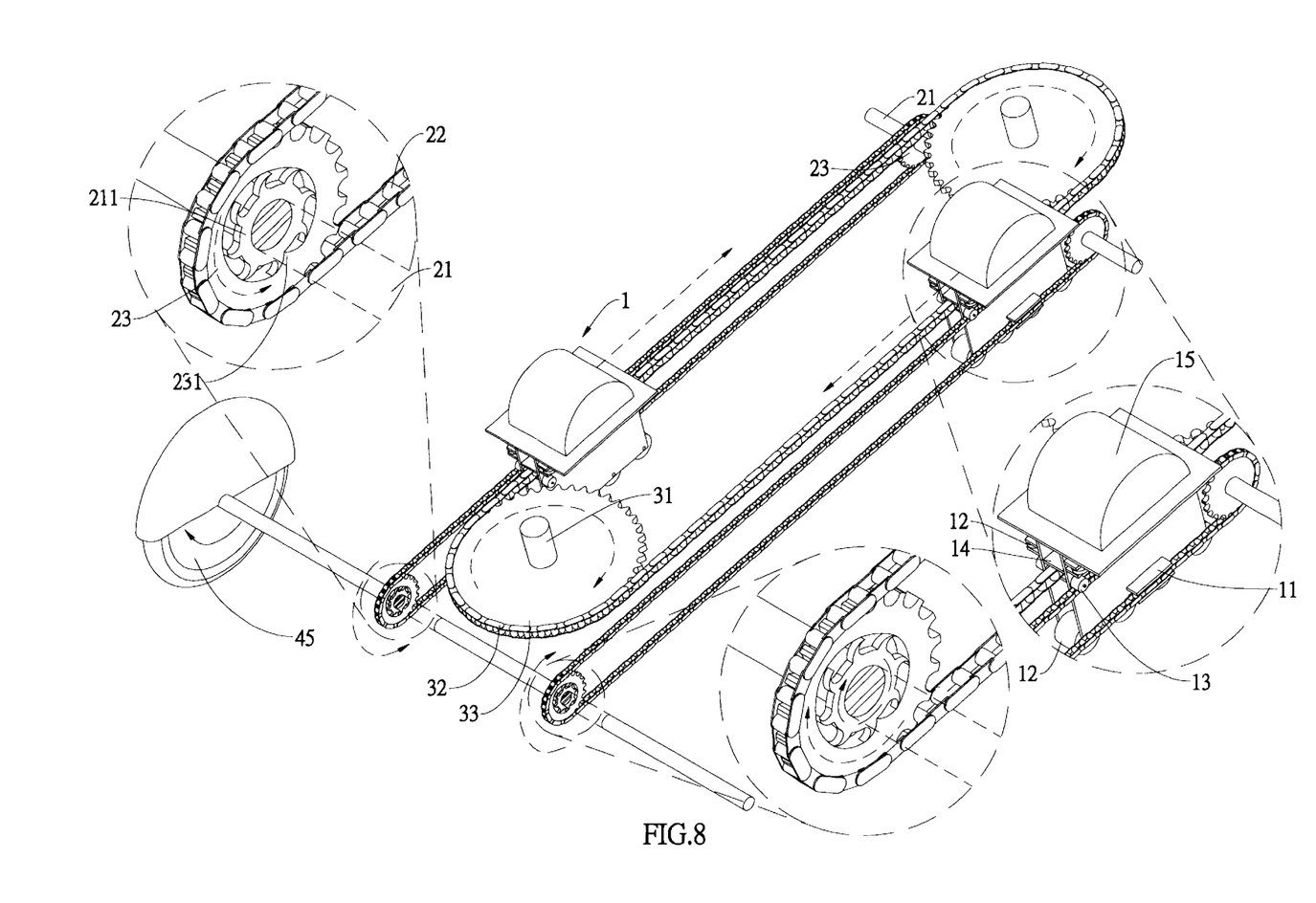
FIG. 8 is a perspective view showing the assembly and the operation of the actuating mechanism, the transmission mechanism, and the driven mechanism of the present invention.
Figure 9:
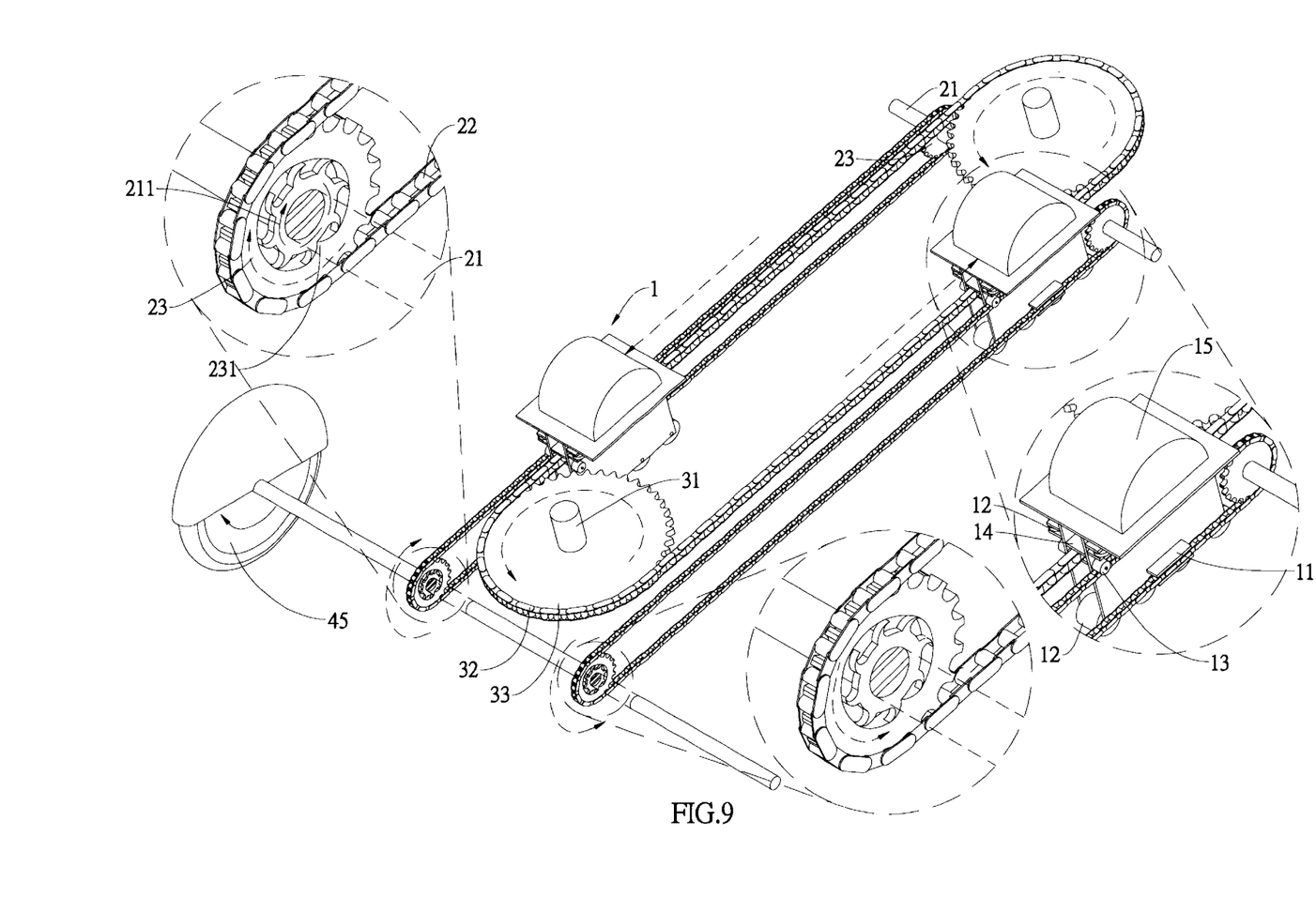
FIG. 9 is another perspective view showing the assembly and the operation of the actuating mechanism, the transmission mechanism, and the driven mechanism of the present invention.

FIG. 7 is a perspective view of a vehicle 4 equipped with the kinetic energy generating mechanism of the present invention. To move the vehicle 4, a user (not shown) may stand on the vehicle 4 with two hands gripped at two handlebars 44 provided at a top a steering stem 43 in front of the vehicle 4, and two feet separately stepped on two upward protruded tops 15 of the two actuating mechanisms 1 to rearward slide either of them. Since the transmission member 32 of the driven mechanism 3 is fixedly connected to the connecting means 14 of the two actuating mechanisms 1, as shown in FIGS. 8 and 9, one of the two actuating mechanisms 1 that is rearward slid will push the transmission member 32 of the driven mechanism 3 backward and accordingly rotate the driving members 33 about the pivotal shafts 31 clockwise. Meanwhile, the other actuating mechanism 1 fixedly connected to the other path defined by the transmission member 32 is naturally moved forward. That is, the user needs only to apply a backward force on one of the actuating mechanisms 1 with one foot each time to easily bring the two actuating mechanisms 1 to slide on the vehicle 4 reciprocatingly. Efforts that have to be made by the user for moving the vehicle 4 are therefore largely reduced.

Please refer to FIG. 8. When a first actuating mechanism 1 is slid backward, it also causes the transmission member 22 of the transmission mechanism 2 connected to the locating means 11 at an outer side of the actuating mechanism 1, and accordingly the front and rear driving members 23, to rotate clockwise. At this point, the unidirectional-rotation control means 211 on the rear rotating shaft 21 engaged with the engaging means 231 on the rear driving member 23 rotating clockwise is brought by the rear driving member 23 to rotate clockwise, too. This causes the rear rotating shaft 21 and two rear wheels 45 connected to two outer ends of the rear rotating shaft 21 to rotate clockwise.

Please refer to FIG. 9. When the user slides the other actuating mechanism 1 backward and therefore causes the first actuating mechanism 1 to slide forward, the transmission member 22 fixedly connected to the locating means 11 of the first actuating mechanism 1 is brought to rotate counterclockwise. At this point, since the unidirectional-rotation control means 211 on the rear rotating shaft 21 can be turned in only one direction and can not be turned rearward, the engaging means 231 on the rear driving member 23 does not engage with the unidirectional-rotation control by means 211 and causes the rear driving member 23 to idle without rotating the rear wheels 45 backward. Therefore, the vehicle 4 is kept moving forward.

In brief, with the above arrangements, the present invention enables a user to apply a backward force on either of the two actuating mechanisms 1 to move the vehicle 4 forward in an energy-saving manner. The present invention ids therefore improved and more practical for use as compared with conventional kinetic energy generating mechanisms.

The following are some advantages of the present invention:
1. The driven mechanism 3 connected to the actuating mechanisms 1 enables saving of more energy.
2. Since two sets of actuating mechanism 1 and transmission member 22 are provided at two lateral sides of the vehicle 4, and the rear driving members 23 are provided with engaging means 231 to engage with the unidirectional-rotation control means 211, the user needs only to apply a rearward force with one foot on either of the two actuating mechanisms 1 to rotate the rear wheels 45 clockwise and accordingly move the vehicle 4 forward.

The present invention has been described with a preferred embodiment thereof and it is understood that many changes and modifications in the described embodiment can be carried out without departing from the scope and the spirit of the invention as defined by the appended claims.

What is claimed is:

1. A kinetic energy generating mechanism comprising a pair of actuating mechanisms and a transmission mechanism; said transmission mechanism including a front and a rear rotating shaft, a pair of transmission members, and two pairs of front and rear driving members; each said rotating shaft being rotatably connected at two ends to a vehicle at predetermined positions for said driving members to rotatably mount thereon; at least said rear rotating shaft being provided at predetermined positions with two unidirectional-rotation control members to separately engage with two engaging means provided on at least said rear driving members; and each said actuating mechanism being fixedly connected at a predetermined position to one said transmission member of said transmission mechanism; whereby when a rearward force is applied on either of said two actuating mechanisms for the same to slide backward on said vehicle, said transmission member fixedly connected to said backward slid actuating mechanism and one corresponding pair of said front and rear driving members are caused to rotate clockwise and thereby forward rotates rear wheels of said vehicle connected to outer ends of said rear rotating shaft, which is rotated through engagement of said rear driving member with said unidirectional-rotation control means.

2. The kinetic energy generating mechanism as claimed in claim 1, wherein said transmission members of said transmission mechanism are preferably chains.

3. The kinetic energy generating mechanism as claimed in claim 1, wherein said driving members of said transmission mechanism are preferably gears.

4. The kinetic energy generating mechanism as claimed in claim 1, wherein said actuating mechanisms are provided with sliding members in order to smoothly slide on s aid vehicle.

5. The kinetic energy generating mechanism as claimed in claim 4, wherein said sliding members of said actuating mechanisms are preferably rollers.

6. The kinetic energy generating mechanism as claimed in claim 1, wherein said actuating mechanisms are provided with brake members to prevent said transmission members from easily becoming loose and deformed during rotating.

7. The kinetic energy generating mechanism as claimed in claim 6, wherein said brake members of said actuating mechanisms are rollers.

8. The kinetic energy generating mechanism as claimed in claim 1, wherein said actuating mechanisms are provided with locating members to which said transmission members of said transmission mechanism are fixedly connected.

9. The kinetic energy generating mechanism as claimed in claim 1, wherein said unidirectional-rotation control members provided on at least said rear rotating shaft of said transmission mechanism are preferably unidirectional gears.

10. The kinetic energy generating mechanism as claimed in claim 1, further comprising a driven mechanism connected to said actuating mechanisms; said driven mechanism including front and rear pivotal shafts, a transmission member, and front and rear driving members; said driving members being rotatably mounted on said vehicle via said pivotal shafts that are fixedly connected to said vehicle at predetermined positions, said transmission member being wound around said two driving members to define two parallel moving paths, to which said two actuating mechanisms are separately fixedly connected and can therefore be slid with even reduced effort.

11. The kinetic energy generating mechanism as claimed in claim 10, wherein said transmission member of said driven mechanism is preferably a chain.

12. The kinetic energy generating mechanism as claimed in claim 10, wherein said front and rear driving members of said driven mechanism are preferably gears.

13. The kinetic energy generating mechanism as claimed in claim 10, wherein said actuating mechanisms are provided with connecting members to which said transmission member of said driven mechanism is fixedly connected.

* * * * *